United States Patent [19]
Earnshaw

[11] Patent Number: 6,110,032
[45] Date of Patent: Aug. 29, 2000

[54] SHELLFISH PROCESSING APPARATUS

[75] Inventor: Dennis Charles Earnshaw, Western Australia, Australia

[73] Assignee: OCTA Technologies Pty Ltd., Australia

[21] Appl. No.: 09/308,686

[22] PCT Filed: Nov. 21, 1997

[86] PCT No.: PCT/AU97/00787

§ 371 Date: May 21, 1999

§ 102(e) Date: May 21, 1999

[87] PCT Pub. No.: WO98/23163

PCT Pub. Date: Jun. 4, 1998

[30] Foreign Application Priority Data

Nov. 25, 1996 [AU] Australia .................................. PO 3809

[51] Int. Cl.[7] .................................................. A22C 29/04
[52] U.S. Cl. .................................. 452/20; 452/18; 452/15
[58] Field of Search ................................ 452/20, 15, 8, 452/18

[56] References Cited

U.S. PATENT DOCUMENTS

| 3,156,948 | 11/1964 | Polito | 452/20 |
| 3,247,542 | 4/1966 | Jonsson . | |
| 3,257,684 | 6/1966 | Wenstrom | 452/20 |
| 3,594,860 | 7/1971 | Nelson . | |
| 3,688,344 | 9/1972 | Carlson . | |
| 4,361,933 | 12/1982 | Rodman et al. . | |
| 4,663,805 | 5/1987 | Adcock . | |
| 4,691,412 | 9/1987 | Brown . | |
| 4,703,541 | 11/1987 | Howard et al. | 452/20 |
| 5,145,448 | 9/1992 | Ebisuzaki | 452/18 |

FOREIGN PATENT DOCUMENTS 482795  12/1975  Australia .

OTHER PUBLICATIONS

Australian Specification and Abstract for SN: AU–A–60192/86.

International Search Report, dated Dec. 19, 1997.

*Primary Examiner*—Willis Little
*Attorney, Agent, or Firm*—Howard & Howard

[57] ABSTRACT

A shellfish processing apparatus (10) particularly intended for Scallop Processing, in which a gripped shellfish is partially opened initially by manipulator means (12) so as to enable meat to be removed from one shell half at a station (22), and then opened fully at a station (24) for evisceration at a station (28) removal of meat from the remaining shell half at a station (32). The evisceration means (113) preferably includes a backing plate (122) which serves to concentrate water around the shell half being eviscerated and to hold the adductor muscle in place.

8 Claims, 2 Drawing Sheets

SHELLFISH PROCESSING APPARATUS

DESCRIPTION OF THE INVENTION

The present invention relates to a shellfish processing apparatus.

SUMMARY OF THE INVENTION

A shell fish processing apparatus characterised by including at least one manipulator means for holding and opening a shell fish, a plurality of stations at which shell fish are processed, a means for moving the manipulator means and the stations relative to one another so as to process the shell fish held by the manipulator means, a means for admitting water into the apparatus to form a bath and an evisceration means provided below the water level of the bath at a station wherein a water jet is applied from a first nozzle and suction from a second nozzle so as to selectively remove mantle and mid gut gland from a shell half gripped by the manipulation means, the first and second nozzles being mounted to a backing plate which serves to concentrate water around the shell being eviscerated and to cause the abductor muscle to be held to the shell half to which it is connected.

The apparatus of the present invention will henceforth be described with particular reference to the processing of scallops but it is to be understood that the apparatus is of general applicability to processing of shellfish.

BRIEF DESCRIPTION OF THE DRAWINGS

The present invention will now be described, by way of example, with reference to the accompanying drawings, in which.

DETAILED DESCRIPTION OF THE INVENTION

Figure 1:
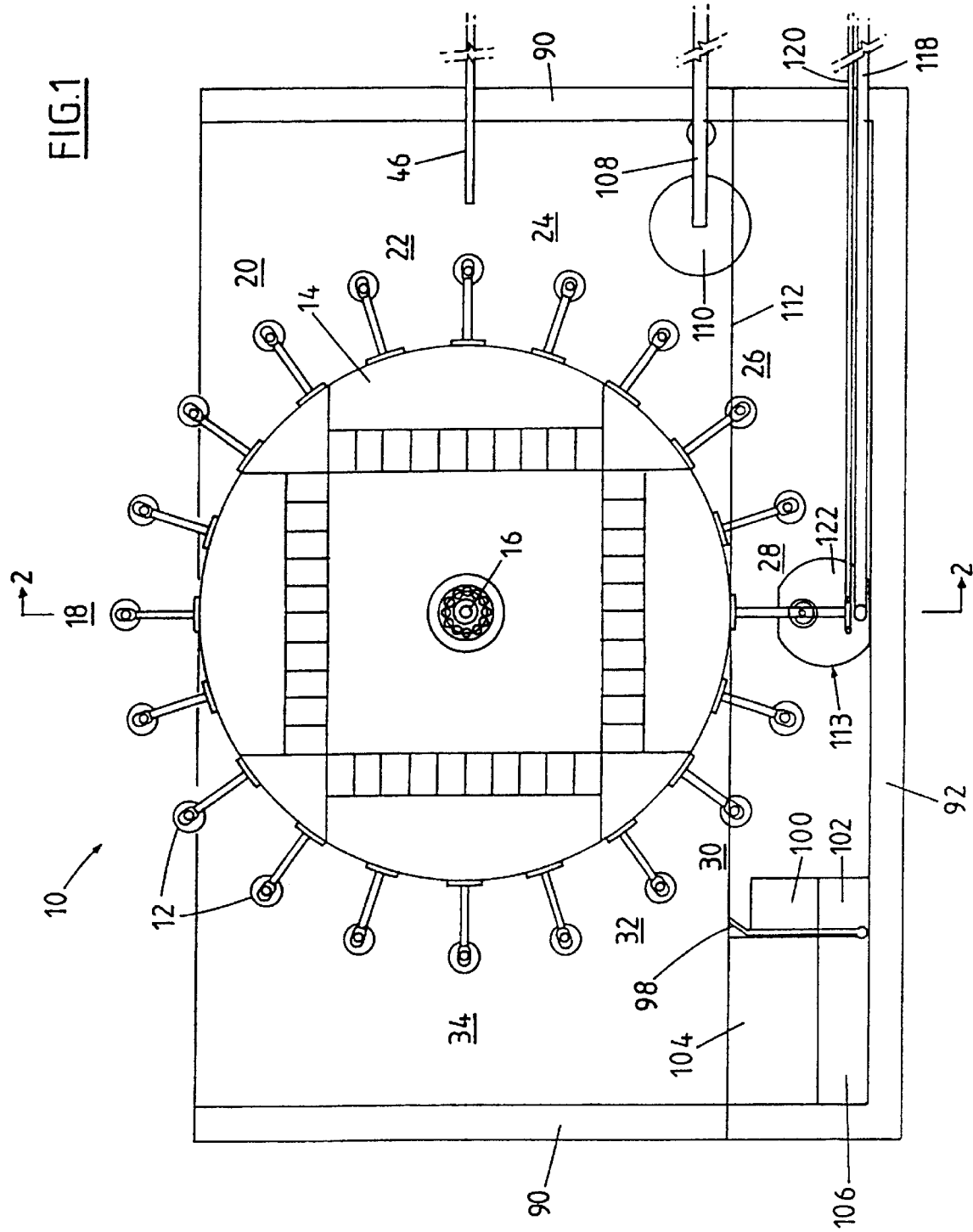
FIG. 1 is a schematic side elevation of an apparatus for processing shellfish in accordance with the present invention.
Figure 2:
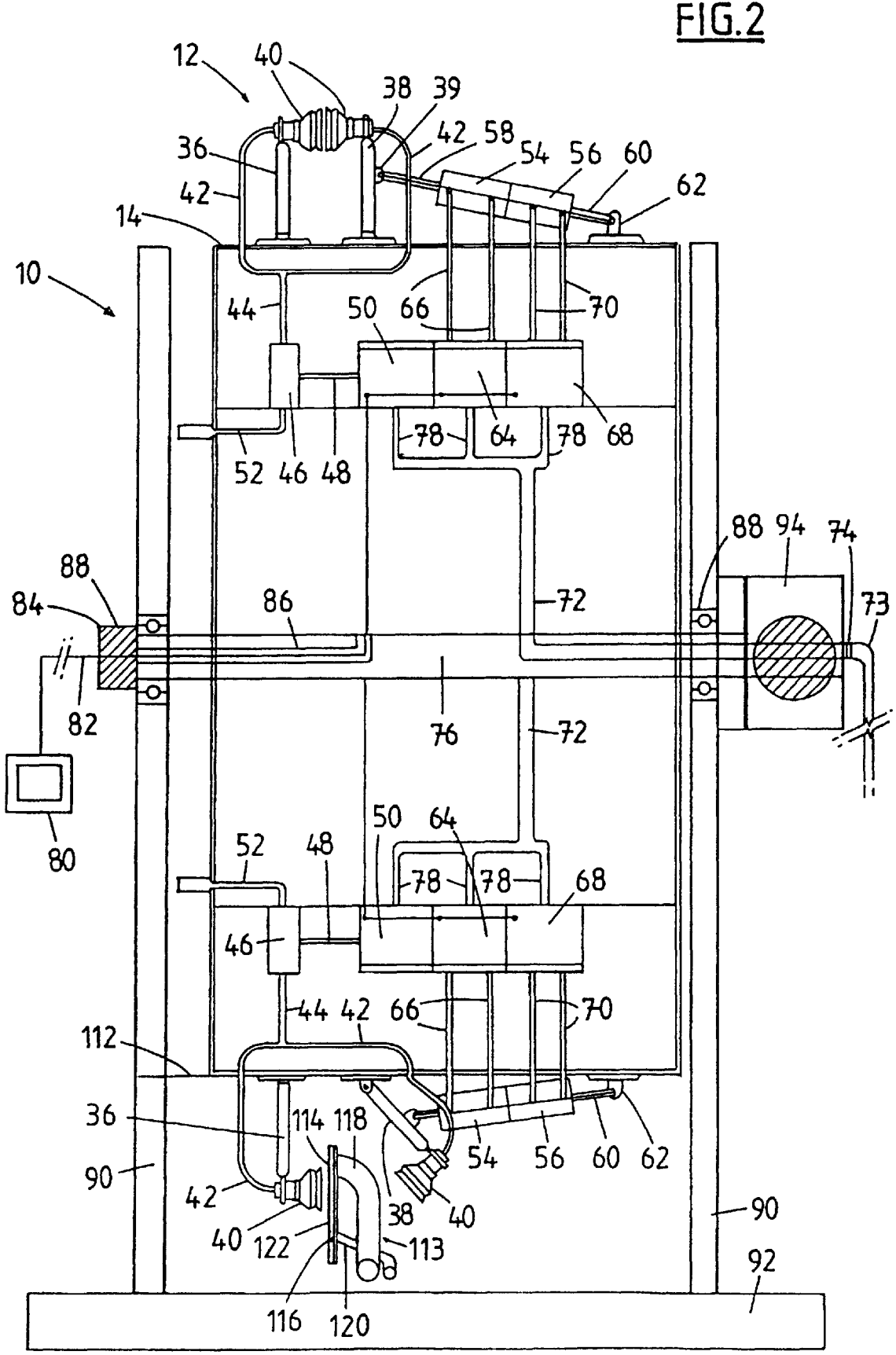
FIG. 2 is a schematic sectional view of the apparatus of FIG. 1 above the line 2—2.

In FIGS. 1 and 2 of the accompanying drawings there is shown an embodiment of a scallop processing apparatus 10 in accordance with the present invention.

The scallop processing apparatus 10 includes a plurality of manipulators 12 mounted in radially spaced manner about the periphery of a drum 14 and extending outwardly therefrom. The drum 14 is axially rotatably about an axis 16 shown in FIG. 1.

The apparatus 10 also includes a number of processing stations 18, 20, 22, 24, 26, 28, 30, 32 and 34 which are spaced around the periphery of the drum 14 A processing action/step/stage is performed on the scallop shells at each processing station. As shown in FIG. 2, each manipulator 12 includes a fixed arm 36 projecting outwardly from the drum 14 and a pivotable arm 38 projecting outwardly from the drum 14. Further, a respective suction cup 40 is mounted to an outer end of each arm 36 and 38. As shown, the arms 36 and 38 are spaced apart and the respective suction cups 40 face one another and are thus opposed to one another.

Each suction cup 40 is connected to a respective tube 42. The tubes 42 join to form a common tube 44 which is connected to a vacuum generator 46. The vacuum generator 46 is connected via a line 48 to a valve 50. Further, an exhaust tube 52 extends away from the vacuum generator 46.

Further, each pivotable arm 38 is connected to a pair of pneumatic cylinders 54 and 56. The cylinder 54 has a piston rod 58 pivotally connected to the arm 38 by means of a clevis 39. The cylinder 56 has a piston rod 60 pivotally connected to a clevis 62 mounted on the drum 14. As shown the pneumatic cylinders 54 and 56 are mounted in alignment and back to back so that the piston rods 58 and 60 extend in opposite directions.

The pneumatic cylinder 54 is connected to a valve 64 via pneumatic lines 66 whilst the pneumatic cylinder 56 is connected to a valve 68 via pneumatic lines 70. A tube means 73 extends from an air compressor (not shown) through a rotary fitting 74 into a hollow shaft 76 at the axis 16 of the drum 14. The tube means 72 extends into a respective branch 78 for each of the valves 50, 64 and 68.

Further, there is provided a computer 80 which controls operation of the apparatus 10. The computer 80 is connected via a cable means 82 to each of the valves 50, 64 and 68. The cable means 82 extends through a slip ring 84 and a conduit 86 in the shaft 76. Further, the shaft 76 is rotatably mounted in bearings 88 mounted in walls 90 extending upwardly from a base 92. Further, the shaft 76 is axially rotated by means of an electrical motor 94.

The apparatus 10 further includes a high pressure water jet 46 at station 22 as shown in FIG. 1. A further high pressure jet 98 is located at station 32. Also at station 32 there is provided a meat bin 100 having an exit 102. Adjacent the meat bin 100 there is also provided a shell bin 104 with an exit 106.

Further, as shown in FIG. 1, there is provided a mains water supply connection 108 which passes through a wall 90 and is provided with a float valve 110. The float valve enables water to be admitted into the apparatus 10 to a level where the station 28 is immersed in a water bath as shown by the line 112.

At the station 28 there is provided an evisceration means 113 including a suction nozzle 114 and a water jet nozzle 116. The suction nozzle 114 is connected to a suction tube 118 whilst the water jet nozzle 116 is connected to a water jet tube 120. The nozzle 114 and 116 are mounted in a backing plate 122.

In operation, the shaft 76 and therefrom the drum 14 and all associated equipment is rotated by the electrical motor 94. Further, compressed air is supplied to the valves 50, 64 and 68 from the compressor via the tubes 72 and 78. Further, appropriate signals are transmitted from the computer 80 through the cables 82 to the valves 50, 64 and 68 and the stations described above.

At predetermined points during the rotational cycle the apparatus 10, a coded signal is sent from the computer 80 to the valve 50 which signal causes the valve 50 to open to the vacuum generator 46. This causes air to be exhausted from the tubes 44 and 42 and the suction cup 40 and to be exhausted through the exhaust tube 52 to atmosphere. When the coded signal to the valve 50 is turned off air returns to the tubes 44 and 42 and the suction cups 40 through the line 48, the vacuum generator 46 and the tube 52.

Also, at predetermined points during the rotational angle of the apparatus 10, coded signals are sent from the computer to the valves 64 and 68 which allows compressor air to operate the cylinders 54 and 56.

In one mode of operation, a scallop shell is placed between a pair of opposed suction cups 40. Then the pivoting arm 38 is pivoted toward the fixed arm 36 until the suction cups 40 are pressed firmly against the scallop shell. This action ts achieved by the valve 64 admitting compressed air into the lower chamber (as seen in FIG. 2) of the cylinder 54. This causes the shaft 58 to pivot the arm 38 towards the arm 36. Subsequently, air is extracted from the suction cups 40 by the vacuum generator 46 as described above. The collapsing suction cups 40 affixed to opposite shell halves of the scallop shell partially open the scallop shell about 10 mm against the hinge joint of the scallop shell.

In an alterative mode of operation, a scallop shell is placed between a pair of opposed suction cups 40. Compressed air is admitted via the valve 68 into the upper chamber (as seen in FIG. 2) of the cylinder 56. At the same time air is admitted via valve 64 into the lower chamber of cylinder 54. This causes the cylinders 54 and 56 and the shaft 58 to move away from the shaft 60 and the clevis 62. Thus, the arm 38 is pivoted towards the arm 36 so that the suction cups 40 become firmly pressed against the scallop shell.

The air is exhausted from the tubes 42 and 44 and the suction cups 40 as described above so that the suction cups become firmly affixed to the respective opposite sides of the scallop shell.

Air is then admitted to the lower chamber of the cylinder 56 causing the cylinders 54 and 56, the shaft 58 and arm 38 and the corresponding suction cup 40 to move towards the clevis 62. This movement causes the scallop shell to open partially such as by about 10 mm against the hinge joint of the scallop shell.

In another embodiment, the scallop shells may be partially opened by a combination of the above described techniques.

Referring now to FIG. 1, the various stations operate as follows.

At station 18 a manipulator 12 picks up a scallop shell as described above. At station 20 each scallop shell is partially opened as described above. At station 22 the high pressure water jet 46 removes meat from the shell half attached to the suction cup 40 connected to the pivotable arm 38.

At station 24 the scallop shell is fully opened by air being admitted via valve 64 into the upper chamber of cylinder 54 moving shaft 58, arm 38 and cup 40 towards clevis 62 so that the shell halves are fully separated from one another. At station 26 the separated shell halves attached to respective suction cups 40 enter the water bath.

At station 28, the shells halves attached to the suction cup 40 connected to the fixed arm 36 are eviscerated under water by applying suction at the nozzle 114 and a jet of water from the nozzle 116. The backing plate 122 enables water to be concentrated around the shell half being eviscerated and the abductor muscle to be held to the shell halves during evisceration. In this connection the back wash from the nozzle 116 impacts against the backing plate 122 and ensures that there is better suction by the nozzle 114 compared to when the backing plate 122 is absent.

At station 30 the scallop shell halves are removed from the water bath. At station 32 a jet of water from the jet 98 removes meat from the shell held by suction cup 40 attached to the fixed arm 38 and the meat falls into the bin 100.

At station 34 air is admitted back to the suction cups 40 and the shall halves are released to fall under gravity into the bin 104. The manipulator 12 then returns to station 18 for the next cycle.

Each manipulator 12 goes through the cycle described above for each complete rotation of the drum 14. However, if for some reason a shell is not picked up by a manipulator on a particular cycle, the computer is preferably configured so as to receive this data and to not actuate that manipulator on that cycle.

Also, whilst it is preferred to use pneumatic means for operation of the manipulators 12, it is possible to use hydraulic operation. However, pneumatic operation has the advantage of allowing a cushioning effect upon movement of the pivotable arm 38.

Modifications and variations such as would be apparent to a skilled addressee are deemed within the scope of the present invention.

What is claimed is:

1. A shell fish processing apparatus comprising at least one manipulator means for holding and opening a shell fish, a plurality of stations at which shell fish are processed, a means for moving the manipulator means and the stations relative to one another so as to process the shell fish held by the manipulator means, wherein the or each manipulator means has first and second holding means for holding the shell fish, at least one of the holding means being movable, and means for relatively moving the holding means in at least two stages so as to enable a shell fish held in the manipulator means to be opened in at least two stages, and wherein a plurality of cylinders are provided having extendible pistons and being endwise connected to each other between a moveable holding means and a fixed position such that independent contraction or expansion of the pistons allows the movable holding means to be movable between a plurality of positions to enable a shell fish held by the manipulator means to be opened in at least two stages.

2. A shell fish processing apparatus according to claim 1, wherein the first and second holding means are in the form of arms, each arm being provided with a respective suction means.

3. A shell fish processing apparatus according to claim 1, wherein the first and second holding means are in the form of arms, each arm being provided with a respective suction means, and one of the arms being fixed and the other of the arms being movable.

4. A shell fish processing apparatus according to claim 1, wherein a high pressure water jet is provided at a station for selectively removing meat from one shell half of a partially opened shell fish.

5. A shell fish processing apparatus according to claim 1, wherein a high pressure water jet is provided at a further station for removing the abductor muscle from a shell half containing it.

6. A shell fish processing apparatus according to claim 5, wherein means is provided for receiving the removed abductor muscle under influence of gravity.

7. A shell fish processing apparatus according to claim 1, wherein the pistons are pneumatically operated.

8. A shell fish processing apparatus according to claim 1, wherein means is provided for producing a vacuum in the suction means for gripping of a shell fish and for selectively removing the vacuum when processing of the shell fish has been completed.

* * * * *